June 19, 1923.
C. F. A. NUEBLING
1,459,685
ANTISKID DEVICE
Filed Feb. 17, 1923
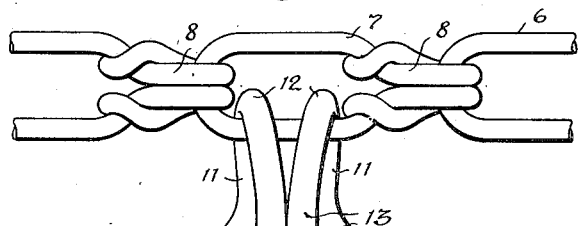
Fig. 1,
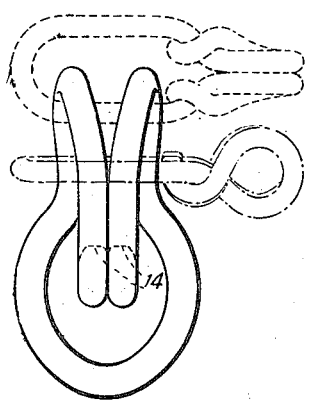
Fig. 2,
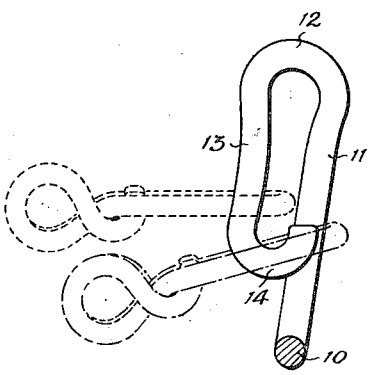
Fig. 3,
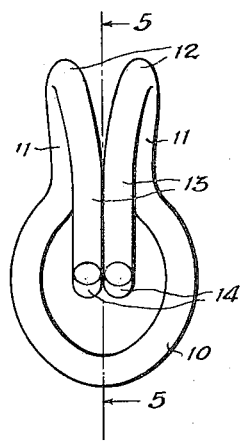
Fig. 4,
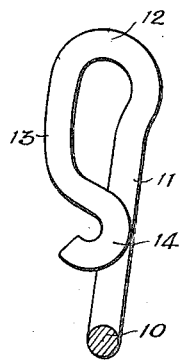
Fig. 5.
WITNESSES
INVENTOR
C. F. A. NUEBLING
BY
ATTORNEYS Patented June 19, 1923.

1,459,685

UNITED STATES PATENT OFFICE.

CHARLES FREDRICH AGUSTUS NEUBLING, OF HEWLETT, NEW YORK.

ANTISKID DEVICE.

Application filed February 17, 1923. Serial No. 619,684.

*To all whom it may concern:*

Be it known that I, CHARLES F. A. NUEBLING, a citizen of the United States, and a resident of Hewlett, Long Island, in the county of Nassau and State of New York, have invented a new and Improved Antiskid Device, of which the following is a full, clear, and exact description.

This invention relates to improvements in accessories for motor vehicles, and has particular reference to an anti-skid device for the vehicle wheels.

An object of the invention is to provide an improved construction in which accidental detachment of the cross chains from the side chains will be prevented.

Another object is to provide a connection between the side and cross chains by means of which said chains may be readily and quickly detached from each other when it is desired to replace a chain or link.

A further object is the provision of an anti-skid device of simple and inexpensive construction which may be manufactured at a minimum cost.

The above and other objects will appear more clearly from the following detail description, when taken in connection with the accompanying drawing, which illustrates preferred embodiments of the inventive idea.

In the drawing—

Figure 1 is a fragmentary plan view of one form of the anti-skid device showing the connection between a side and cross chain;

Figure 2 is a similar view of the hook member which includes the essential features of the invention, the dotted line positions of one of the links of a side chain illustrating the only movement of which said link is capable when the chain is in operative position and the links thereof are disposed in substantially concentric relation to the periphery of the wheel;

Figure 3 is a longitudinal section through the hook member, the dotted line positions of a side chain link illustrating the manner in which said side chain may be detached from the hook member;

Figure 4 is a view similar to Figure 2 illustrating a slightly different form of the invention; and Figure 5 is a section on the line 5—5 of Figure 4.

Referring more particularly to the accompanying drawing, the numeral 6 indicates one of the side chains of the anti-skid device which includes a plurality of similarly constructed links 7 of a well known type, each of which is provided with a loop portion 8 at one end to receive an end of an adjacent link. The device further includes a plurality of cross chains also comprising the links 9. Each end of each of the cross chains has connected thereto a hook member for attaching the cross chain to links 7 of the side chains.

Each of said hook members is preferably formed of a single length of suitable material which is bent to provide a bight 10, the width of which is greater than the interior length of the link 7 of the side chain to which it is attached. The portions 11 of the hook member are extended from the bight 10 in slightly diverging relation and are then curved outwardly, as indicated at 12, so that the ends 13 thereof will extend back toward the bight 10 in superposed relation thereto, the portions 11, 12 and 13 thus forming a second bight for receiving the link 7 of the side chain. The extremities 14 are then curved inwardly, as best shown in Figure 3, and are disposed substantially in the plane of the portions 11, but do not extend beyond the inner or tire engaging surfaces of said portions 11 so as to avoid any possible injury to the tire. By thus bending the material of which the hook member is formed a continuous loop is provided, the ends of which are formed by the portions 12 and extremities 14. If desired, the portions 11 and curved ends 12 may be brought into abutting relation when forming the hook.

When the device is in its operative position, as shown in Figures 1 and 2, the movement of the link 7 with respect to the hook member is limited either by the bight 10, or by the ends of the loop formed by the portions 12 and extremities 14. In other words, should the device be sufficiently loose on the wheel to permit of a movement of the link 7 longitudinally of the portions 11 of the hook 7 and between the same and the tire, as might occur by a turning under of the side of the link 7 not engaged by said hook member, such movement will be limited by engagement of the link with the bight 10 which, as previously explained, is of a greater width than the interior length of said link.

Should the link 7 turn in an opposite direction, that is, outwardly with the side of said link not engaged by the portions 12 overhanging the portions 13, as illustrated in dotted lines in Figure 2, the relative movement of the link in the loop formed by the curved portions 12 and 13 will be limited by said portions, thus effectively preventing detachment of the hook member from said link as long as said link remains in a position substantially concentric to the periphery of the wheel.

Should it be desired to detach the hook member from the link 7 in order to repair either of the chains, it is first necessary to remove the device from the wheel, after which the loop 8 of the link next adjacent to the link 7 to which the hook member is attached may be moved to the end of the link 7 at which the loop 8 thereof is formed, whereupon the link may be turned to a position at right angles to its normal operative position, as shown in Figure 3, with said link extending outwardly at substantially right angles to the plane of the bight 10. The link may then be moved toward the extremities 14 and inasmuch as the interior length of the link is greater than the distance between the outer surfaces of the extremities 14 and the outer surfaces of the portions 13 contiguous to said extremities, it will be obvious that by such movement, which is indicated in dotted lines in Figure 3, the link may be passed beyond the extremities 14 and then withdrawn from engagement with the hook member.

In Figures 4 and 5, the hook member is of substantially the same construction as that already described, the only difference being that the extremities 14 are first curved inwardly toward the bight 10 and then outwardly therefrom so as to present a rounded surface to the tire, thus entirely eliminating any possibility of injury to the tire by engagement of the sharp edges of the extremities 14 therewith. Otherwise, the construction and operation of the device is exactly the same as that described in connection with the form shown in Figure 1.

What is claimed is:

A hook member for joining an end link of one of the cross chains of an anti-skid device to a link of one of the side chains thereof, said member being formed with a single length of material bent to provide a bight for receiving a link of one of said chains, the extremities of said material being curved and a portion thereof between the curved extremities and said bight being bent over upon said bight to form a second bight for receiving a link of the other chain, said curved extremities being adapted to limit the movement of the last named link toward the closed end of the first named bight.

CHARLES FREDRICH AGUSTUS NUEBLING.